United States Patent [19]

Tokarz et al.

[11] Patent Number: 4,950,627
[45] Date of Patent: Aug. 21, 1990

[54] CERAMIC COATING ON METAL

[75] Inventors: Bozena Tokarz, Kungälv; Bernt Larsson, Hisings Backa; Sven Järas, Kungälv, all of Sweden

[73] Assignee: Eka Nobel AB, Surte, Sweden

[21] Appl. No.: 381,946

[22] Filed: Jul. 19, 1989

[30] Foreign Application Priority Data

Jul. 21, 1988 [SE] Sweden ................................ 8802689

[51] Int. Cl.$^5$ .............................................. C04B 14/00
[52] U.S. Cl. ........................................ 501/95; 501/94; 106/602; 106/605; 106/626; 428/34.6
[58] Field of Search .................... 501/95, 94; 106/74, 106/75, 84; 428/34.4, 34.6; 427/230

[56] References Cited

U.S. PATENT DOCUMENTS 3,568,723  3/1971  Solsards .............................. 138/143
3,830,173  8/1974  Hubble et al. ..................... 110/182.5
3,837,899  9/1974  Carlberg ............................. 117/92
4,248,752  2/1981  Myles .............................. 260/29.1 R

FOREIGN PATENT DOCUMENTS 1117950  6/1968  United Kingdom .

Primary Examiner—Mark L. Bell
Assistant Examiner—Chris Gallo
Attorney, Agent, or Firm—Burns, Doane, Swecker & Mathis

[57] ABSTRACT

The invention relates to a composition for forming a heat-insulating ceramic coating on a metal, said composition comprising, in % by weight:
- 10–50% of potassium silicate
- 10–50% of silica
- 5–40% of inorganic filler
- 1–25% of ceramic fibres
- 2–40% of water
- 2–20% of hollow microparticles
- 0–5% of surface active agent.

The invention also relates to a method for preparing a composition having the above-mentioned components.

Furthermore, the invention relates to the use of the composition comprising the above-mentioned components, for application to internal combustion engine exhaust pipes.

Finally, the invention relates to internal combustion engine exhaust pipes coated with layers of the above-mentioned composition.

7 Claims, No Drawings

CERAMIC COATING ON METAL

BACKGROUND OF THE INVENTION

The invention relates to a ceramic composition adapted to form a coating on a metal. The coating is obtained by applying the composition in aqueous slurry. The invention also relates to a method for preparing and applying the composition, the use thereof, and an internal combustion engine exhaust pipe coated with layers of the composition.

In present-day technology, there is a growing need for efficient and formable insulating materials that must have high temperature resistance, excellent thermal insulating power, excellent resistance to thermal shocks, and excellent resistance to chemical corrosion. Such insulating materials are especially attractive to the metal working industry which uses large quantities of sheet-metal, steel and aluminium.

The interest in such materials is especially pronounced in the motor industry (for coating exhaust pipes and engine parts) and in the offshore and ship-building industries (for coatings protecting against fire, corrosion and erosion). Furthermore, these materials are used in combustion plants and processes and in household appliances (kitchen ranges, refrigerators). Above all, however, the motor industry is interested in these materials since motor-cars equipped with catalysts require an appropriate insulation of the exhaust pipe.

It is known from DE-OS 2,751,918 to provide motor-car exhaust pipes with an internal heat-insulating coating consisting of a ceramic slurry with an embedded metal lattice, the interstices of which are filled with the slurry which contains for example sodium silicate, alumina, binder and water. EP-A 101,911 discloses a ceramic coating, in particular for the inner side of an exhaust pipe, said coating containing, besides conventional components, lithium aluminium silicate. US-A 4,248,572 discloses a composition for heat-insulating coatings, said composition comprising ceramic fibres, finely divided silica, an adhesion agent and, optionally, hollow spheres of plastic or ceramic material. It merely appears that the material may be used for insulating furnace walls and furnace parts, and no mention is made of motor-car parts or exhaust pipes.

From GB-A 1.117.950 a ceramic composition for use in bonding an insulating blanket of refractory fibres to a metal surface is known, which composition contains a potassium silicate, barium carbonate and possibly alumina powder. This cement composition thus merely acts as an adhering agent between the insulating blanket and the metal surface, though it is mentioned that a small part of finely chopped ceramic fibres can be included in the cement composition in order to increase the thermal shock resistance of the cement. No mention is made of use in exhaust pipes, the only use stated being on large areas and on steel plates.

SUMMARY OF THE INVENTION

There has now been developed a heat-insulating composition adapted to form a coating on metal. The composition has excellent characteristics with respect to adhesion, insulating power and resistance to temperature, corrosion and thermal shocks. The composition contains ceramic fibres, an inorganic filler, a silica binder material and hollow microparticles in specific proportions and, furthermore, potassium silicate and, optionally, a surface-active agent. In addition, the composition contains water as a carrier material. The composition according to the invention thus comprises, in % by weight:

10–50% of potassium silicate;
10–50% of silica;
5–40% of inorganic filler;
1–25% of ceramic fibres;
2–40% of water;
2–20% of hollow microparticles; and
0–5% of surface active agent.

A composition suitable for most applications is, in % by weight:

20–35% of potassium silicate
20–35% of Colloidal silica;
10–25% of inorganic filler;
4–15% of $Al_2O_3$-$SiO_2$ fibres;
8–25% of water;
2–8% of hollow microparticles; and
0–5% of surface active agent.

DETAILED DESCRIPTION OF THE PREFERRED EMBODIMENTS

The introduction of potassium silicate into the composition in order to obtain binding and sintering properties constitutes an essential improvement of the temperature resistance because potassium silicate can withstand higher temperatures than the sodium silicates previously used in similar contexts. In addition, this component is far cheaper than the lithium aliminium silicates previously used for such applications. The preferred silicate is potassium water glass, and a suitable molar ratio $K_2O:SiO_2$ is about 3.3. A higher molar ratio imparts a higher viscosity to the slurry.

Besides its binding function, the silica material also serves as a thickener for the slurried composition, and also as a sintering agent. The preferred form is finely divided silica, preferably in colloidal form. Colloidal silica is a product containing about 50% $SiO_2$ and 50% by weight of water.

The inorganic filler improves the insulating power of the layer and affects the properties of the slurry in respect of viscosity, dispersing power and homogeneity. Suitable inorganic fillers may be, for example, talc or zirconia.

The ceramic fibres usually consist of a mineral material, and as a rule use is made of fibres; having a high length-to-width ratio. The fibres preferably consist of an $Al_2O_3$-$SiO_2$ material capable of withstanding temperatures between 900° C and 1600° C. The melting point of the fibres; varies with the ratio of $Al_2O_3$ to $SiO_2$.

The statement regarding the water; content of the composition relates to the amount added in order to obtain a suitable slurry, and it should be noted that the potassium silicate contains bonded water, and that the silica binder, especially the colloidal silica, contains product water.

Hollow microparticles; are incorporated in order to improve the consistency of the slurry and to simplify the drying process by making the system more porous for water removal and for imparting to the finished layer a low heat conductivity. The increased content of air because of the hollow microbodies considerably increases the insulating ability of the coating. The microparticles are hollow filler bodies which usually are spherical. With some types of metal, a small amount of a surface active agent may be incorporated in the composition in order to obtain improved rheological properties regarding the flowability of the slurry on the substrate upon application thereto.

The composition according to the invention is primarily intended to be applied to the inner side of an exhaust pipe. On present-day motor-cars equipped with catalysts, the exhaust pipe is heat-insulated between the engine and the catalyst to quickly reach the ignition temperature of the catalyst. As a rule, the insulation was applied to the outside of the exhaust pipe, because the corrosive atmosphere within the pipe in particular and also the great variations in temperature causes difficulties. However, if the insulating layer is applied to the inner side of the exhaust pipe, the exhaust temperature will rise more quickly, by about 10-20g, in that the exhaust pipe as such is not heated, and the heat is instead conducted directly to the catalyst. On the other hand, it was found difficult to impart to the internal layer the requisite characteristics.

A closely related composition is disclosed in US-A 4,248,752 which, however, makes no mention of its application to exhaust pipes and the specific problems encountered in that connection. The prior art composition was tested in a number of comparison tests together with the composition according to the invention, and it was found that the prior art composition has a higher corrosion tendency than the present composition, primarily because it has a higher pH value, i.e. pH=11, whereas the composition according to the invention has pH=9. Furthermore, the finished coating comprising the prior art composition is fairly soft, presumably because it comprises an adhesion agent, whereas the coating according to the invention is hard.

In a preferred embodiment of the invention, the composition comprises, in % by weight:
25-30% of potassium water glass;
25-30% of colloidal silica;
15-20% of inorganic filler
5-10% of $Al_2O_3$-$SiO_2$ fibres;
2-5% of hollow microspheres; and
10-20% of water.

The composition according to the invention is produced by (1) mixing potassium silicate with ceramic fibres; (2) adding silica binder under continuous agitation; (3) adding the inorganic filler and water and continuing agitation until a homogeneous mixture is obtained; and (4) adding microparticles under careful agitation.

When the composition according to the invention is to be used as a heat-insulating coating on an internal combustion engine exhaust pipe, it is applied in viscous waterslurried form by so-called "pouring through" technique, i.e. the slurry is poured through the pipe to form a coating, dried at 50-150° C. for 0.5-3 hours and at 150-300° C. for 0.5-2 hours, optionally followed by one or more further drying cycles, whereupon the procedure is repeated from 2 to 5 times, preferably 3 times. Each separate layer may obtain a thickness of about 0.5 mm, and a total layer thickness of 1-1.5 mm is preferred.

For some applications with extreme temperature conditions, exhaust port liners are used, and a ceramic composition according to the invention can be applied by casting into the interspaces of the pipe to form a so-called sandwich structure. Immersion technique is used for applying the desired layer which is dried as indicated above in coating, a very high temperature resistance is more important than the mechanical strength characteristics.

EXAMPLE 1 1

From a ceramic composition according to the invention a slurry was prepared which comprised

| Components | Contents (g) | M.P. |
|---|---|---|
| Potassium water glass | 26.3 | |
| Silica sol 50/80[1] | 26.3 | 1710° C. |
| Talc | 18.5 | >1400° C. |
| Ceramic fibre[2] | 7.9 | 1760° C. |
| Hollow spheres | 2.6 | >600° C. |
| Water | 18.4 | |
| | 100.0 | |

[1]colloidal silica, concentration/surface area (conc. = 50% $SiO_2$ in $H_2O$; surface area = 80 $m^2/g$).
[2]ceramic fibre having a heat conductivity of less than 1.0 W/K7m.

The slurry contained 55% solid matter and was prepared as follows.

Potassium water glass was mixed with fibre until the fibre was wet. Silica sol 50/80 was added under continuous agitation. Talc and water were added, and agitation continued until a homogeneous mixture was obtained. Hollow spheres were added under careful agitation.

The composition is suitable for coating the inner side of a motor-car exhaust pipe, and the maximum working temperature is assumed to amount to 800° C. The coating as such can withstand about 1000° C.

The coating thus prepared was applied to the inner surface of a test pipe by so-called "pouring through" technique. Only one layer was applied which was dried at 70-100-150° C. for 2 hours and then at 200-300° C. for 1 hour. The resulting layer had a thickness of more than 0.5 mm.

The mechanical properties of the layer were as follows

| The mechanical properties of the layer were as follows | |
|---|---|
| Vibration test | 10 × $10^6$ cycles at 25 Hz |
| Crush strength | 50-100 kg/$cm^2$ |
| Hardness | 1-3 mm indentation by 5 mm ball pressed at a load of 120 kg |

It appears from these test results that the layer made from the composition according to the invention is highly resistant to mechanical stress.

EXAMPLE 2

From a ceramic composition according to the invention a slurry was prepared which comprised

| Components | Contents (g) | M.P. |
|---|---|---|
| Potassium water glass | 27.8 | |
| Silica sol 50/80[1] | 27.8 | 1710° C. |
| Talc | 16.7 | >1400° C. |
| Ceramic fibre[2] | 11.1 | 1760° C. |
| Metaspheres 100[3] | 5.61 | 1350° C. |
| Water | 11.0 | |
| | 100.0 | |

[3]hollow bodies of especially high-melting glass where 100 is a measure of the particle size distribution (μ).

The slurry contained about 58% solid matter and 52% upon dilution with an additional 100 g water. The slurry was prepared in the same manner as in Example 1.

The composition thus prepared is suitable for applications that must withstand temperatures of at least 1400° C. (the temperature of molten iron), especially for applications using casting-in technique, but also for other high temperature uses. The melting points of all components are extremely high.

The composition was applied to an exhaust port liner in the following manner. The liner was immersed in the slurry and conducted to a drier where it was dried as follows: 50–70–100° C./45 min, 100–120–140° C./45 min, 150–170° C./30 min, 200° C./10 min. After cooling to room temperature, a second layer was applied in analogous manner and dried as follows: 50–70–100–120–150° C./2 hours, 150–200–250–300° C./2 hours. The resulting coating had a thickness of about 1–1.5 mm.

In this instance, the mechanical strength was not tested since a cast-in material in a sandwich structure is better protected against mechanical stress. In this instance, the extremely high temperature resistance is very important.

It has thus been found that the ceramic composition according to the present invention is capable of establishing on metal a coating which has excellent mechanical strength characteristics and an excellent temperature resistance.

We claim:

1. A composition for forming a heat-insulating ceramic coating on a metal, comprising:
  (i) 10 to 50% by weight of potassium silicate;
  (ii) 10 to 50% by weight of colloidal silica;
  (iii) 5 to 40% by weight of inorganic filler;
  (iv) 1 to 25% by weight of ceramic fibres;
  (v) 2 to 40% by weight of water;
  (vi) 2 to 20% by weight of hollow microparticles; and
  (vii) 0 to 5% by weight of surface active agent.

2. A composition according to claim 1, wherein the potassium silicate is potassium water glass.

3. A composition according to claim 1, wherein the ceramic fibres are an $Al_2O_3$-$SiO_2$ material.

4. A composition according to claim 1, wherein the inorganic filler is selected from the group consisting of talc and zirconia.

5. A composition according to claim 1, comprising:
  (i) 20 to 35% of potassium silicate;
  (ii) 20 to 35% of colloidal silica;
  (iii) 10 to 25% of inorganic filler;
  (iv) 4 to 15% of $Al_2O_3$-$SiO_2$ fibers;
  (v) 8 to 25% of water;
  (vi) 2 to 8% of hollow microparticles; and
  (vii) 0 to 5% of surface active agent.

6. A method for preparing a composition according to claim 1 comprising;
  (a) mixing the potassium silicate with the ceramic fibres;
  (b) adding the silica under continuous agitation;
  (c) adding the inorganic filler and water and continuing agitation until a homogeneous mixture is obtained; and
  adding the hollow microparticles under agitation.

7. An exhaust pipe of an internal combustion engine including a coating comprising at least one layer of a composition according to claim 1.

* * * * *